March 3, 1970 TOSHIO HIRATSUKA ETAL 3,498,133
APPARATUS FOR MEASURING HIGH TEMPERATURES
Filed Aug. 28, 1967 3 Sheets-Sheet 1
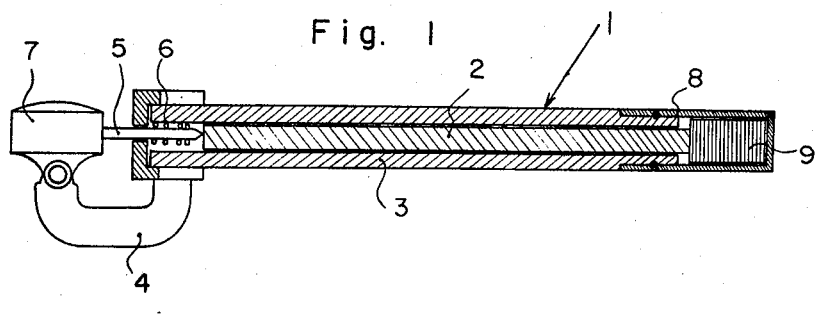
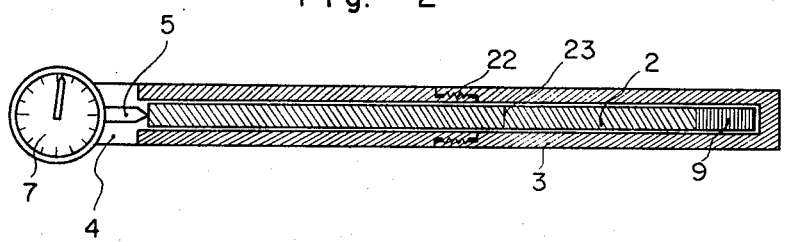
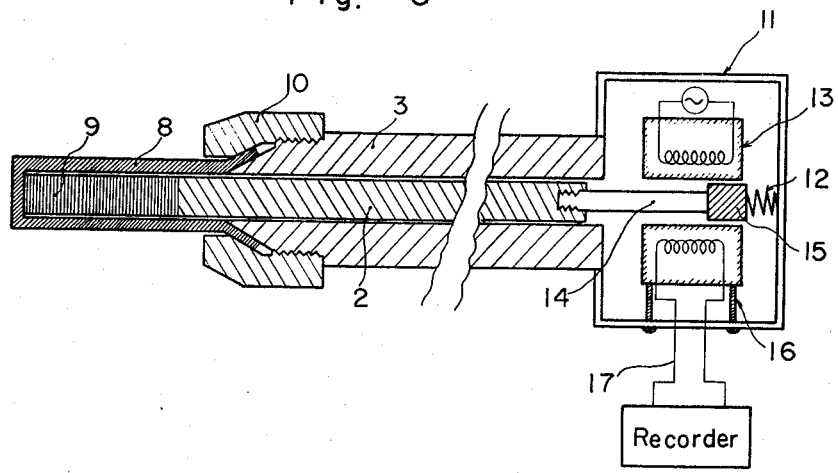
INVENTOR.
Toshio Hiratsuka
Yoichiro Tominaga United States Patent Office 3,498,133
Patented Mar. 3, 1970

3,498,133
APPARATUS FOR MEASURING HIGH
TEMPERATURES
Toshio Hiratsuka and Yoichiro Tominaga, Totsuka-ku, Japan, assignors to Nippon Carbon Company, Limited, Chuo-ku, Tokyo, Japan
Filed Aug. 28, 1967, Ser. No. 663,701
Claims priority, application Japan, Sept. 30, 1966, 41/64,051
Int. Cl. G01k 5/50
U.S. Cl. 73—362.3    9 Claims

ABSTRACT OF THE DISCLOSURE

Pyrolytic graphite deposited by the decomposition of a carbonaceous gas at 2000° C. and upwards, and characterized by the combination of a high refractoriness and a high anisotropy of thermal expansion between the directions parallel and perpendicular to the plane thereof is taken advantage of as a thermally responsive element in a pyrometer of this invention. The pyrometer comprises an elongated tubular body of a refractory material in which a number of pyrolytic graphite pieces laminated in a direction parallel to the plane thereof are provided at one end to be exposed to a high temperature zone of an object the temperature of which is to be measured and a temperature measurement is indicated on a dial gauge fixed to the other end thereof.

---

The present invention relates to apparatus for measuring high temperatures, and more particularly, to a pyrometer of the contact type in which a novel thermally responsive element is used.

In general, it is known that there are two types of temperature measurement, viz., contact and non-contact; the former is directed to a system in which a detecting means including a thermally responsive element is in direct contact with an object to be measured, and a temperature measurement is determined from the temperature of the detecting means under the condition wherein the detecting means has the same temperature as that of the object while, on the other hand, the latter is directed to a system in which the detecting means is not in contact with the object to be measured, and the temperature measurement is effected by utilizing radiation issuing from the object or an electromagnetic property thereof. And it is also known that the contact type thermometry is chiefly directed to the measurement of a relatively low temperature of less than 1000° C. while the non-contact pyrometry is directed to the measurement of a relatively high temperature of 1000° C. and upwards.

As a pyrometer adapted for measuring high temperatures now in common use, there have been used a thermocouple, an optical pyrometer, and a radiation pyrometer, the thermocouple being a contact type, and optical and radiation pyrometers being non-contact type. The above contact type thermocouple adapted for use up to the temperature of 1600° C. usually is a platinum-platinum-rhodium type. Further, a thermocouple comprising tungsten and graphite as its base has been manufactured for trial use adapted for 1600° C. and upwards, but it has never been employed for common use because of a lack of stability of the contacts due to corrosion from oxidation and the high cost, which problems have not been solved yet.

The non-contact radiation pyrometer requires correction for every object to be measured for pyrometry, and further, it cannot be used for measuring temperatures in a gaseous atmosphere where a good view is impossible.

The optical pyrometer now widely employed for measuring high temperatures up to the temp. of 3000° C. is one of the non-contact types, but it has several disadvantages in that it is unable to measure a relatively low temperature up to 700° C., it requires correction in accordance with radiation of an object to be measured, it is also unable to measure temperatures in a gaseous atmosphere where a good view is impossible, and besides, it produces an individual error in measurement.

Briefly stated, in accordance with a preferred embodiment of this invention, this pyrometer uses a solid substance having thermal expansion as a thermally responsive element. In other words, this pyrometer is a contact type taking advantage of the thermal expansion of the solid substance. A similar contact type pyrometer having a limit up to the temperature of 1600° C. utilizes the thermal expansion of quartz. However, such an instrument called a "dialatometer," taking advantage of quartz will be limited in the use up to the temperature of 1600° C. in view of its refractoriness.

In accordance with the present invention, the thermally responsive element thereof has a keen sensitivity for temperature in the very wide range from room temperature to an elevated temperature of 3000° C. and upwards so that the pyrometer including it has several advantages such as that temperature can be detected directly along the calibrated displacement due to thermal expansion, an erroneous measurement of temperature due to an individual error never takes place, a direct detection of temperature enables one to provide an automatic recording means, and an easy and accurate measurement of temperature can be effected by this pyrometer under any condition or circumstances, such as, in a gaseous atmosphere where a good view is impossible, in a hot powdery material to be treated, or in a hot reactor vessel, irrespective of radiation of an object the temperature of which is to be measured.

The pyrometer of this invention has the above-mentioned features which are attributable to the adoption of a pyrolytic graphite as a thermally responsive element. As described above, the principle of the contact type pyrometer is based on the thermal expansion of a solid substance, and one of the most well-known contact type thermal responsive means utilizing thermal expansion of the solid material is a "bimetal" element. A typical bimetal element is formed of two sheets of two different metals having different coefficients of thermal expansion, the sheets being 0.1–0.2 mm. in thickness and being laminated together. When the ambient temperature of the bimetal element rises, one metal of the bimetal element expands more than the other metal and causes the element to bend, which results from the difference of thermal expansion of two metals. However, the use of the bimetal element is usually limited to a relatively low temperature, for example, up to the temperature of 100° C.

On the other hand, however, the pyrolytic graphite which has been adapted as the thermally responsive element of this invention has a high resistance to high temperatures, as high as a temperature of 3000° C. and upwards, as well as a unique property of a high anisotropy of thermal expansion. Although pyrolytic graphite was discovered by Thomas Edison in 1883, it remained essentially a laboratory find for more than 80 years. In accordance with one of the known processes for the manufacture of pyrolytic graphite, it is seen that the decomposition of a carbonaceous natural gas or methane gas at a high temperature above 2000° C. and under a relatively low pressure of 10 mm. Hg releases hydrogen gas and results in the deposition of pyrolytic graphite on an exposed substrate in a vacuum chamber at a rate of decomposition of about 5–50 mils per hour. Unalloyed pyrolytic graphite devoid of any binder is essentially 99.995% pure carbon. The pyrolytic graphite adapted for the present invention is one deposited at a temperature of 1600°–2500° C., and the one heat treated at a temperature of 2000°–3600° C. In addition, pyrolytic graphite having added thereto 0.01–3% B, Mo, Si or Br is known to be "pyrolytic graphalloy" having the same property as pyrolytic graphite and employable as such.

In recent years, with the progress of science and technology, a rather large and thick sheet of pyrolytic graphite has been manufactured. The subject matter of this invention, however, is particularly directed to the high anisotropy of thermal expansion of pyrolytic graphite. It is known that the thermal expansion of pyrolytic graphite is much greater in a direction perpendicular to a plane of deposition than in a direction parallel to the latter plane, the plane of deposition being called, "a–b" or "a" for short while the direction perpendicular thereto is designated "c." In other words, pyrolytic graphite is characterized in that the thermal expansion in the c-direction thereof is about 100–150 times greater than that in the a-direction (see FIG. 6). It has been found that the higher the temperature of heat treatment of pyrolytic graphite, the higher the anisotropy of thermal expansion, and hence a heat treated pyrolytic graphite can be used to advantage.

It is also known that the pyrolytic graphite deposited at a temperature of 2100° C. has a resistance to the heat of the same temperature of 2100° C., and further, pyrolytic graphite deposited at 2100° C. and heat treated to a temperature of 3000° C. has a high resistance to heat at the same temperature of 3000° C. Thus, it has been discovered that pyrolytic graphite has a substantially constant coefficient of thermal expansion in a wide range from room temperature to 3000° C.

In addition, the pyrometer of this invention has a heat resisting protecting tube made of graphite coated with silicon carbide, and this protecting tube is known to have a high heat resistance. Though two kinds of graphite are used in the pyrometer of this invention, each of them has a different coefficient of thermal expansion, the details of which will be described hereinafter.

Accordingly, it is an essential object of this invention to provide a novel pyrometer of contact type adapted for measuring a high temperature in the range of 1000°–3000° C. in a rapid and accurate manner by utilizing the thermal expansion of a solid substance.

It is another object of the invention to provide a novel pyrometer in which pyrolytic graphite is used as a thermally responsive element.

It is another object of the invention to provide a novel pyrometer in which the anisotropy of thermal expansion of pyrolytic graphite is utilized, i.e. the difference of two coefficients of thermal expansion in two directions.

It is still another object of the invention to provide a pyrometer suitable for high temperatures which is simple in construction, dependable in operation and capable of being easily and expeditiously manufactured.

The pyrometer and process for measuring temperatures thereby in accordance with the invention will be described in more detail hereinafter in connection with the accompanying drawings, in which:

FIGURE 1 is a diagrammatic section of the pyrometer of this invention.

FIG. 2 is a diagrammatic section of another embodiment of the pyrometer.

FIG. 3 is a diagrammatic section of a combined apparatus including a pyrometer and automatic recording means.

Figure 4:
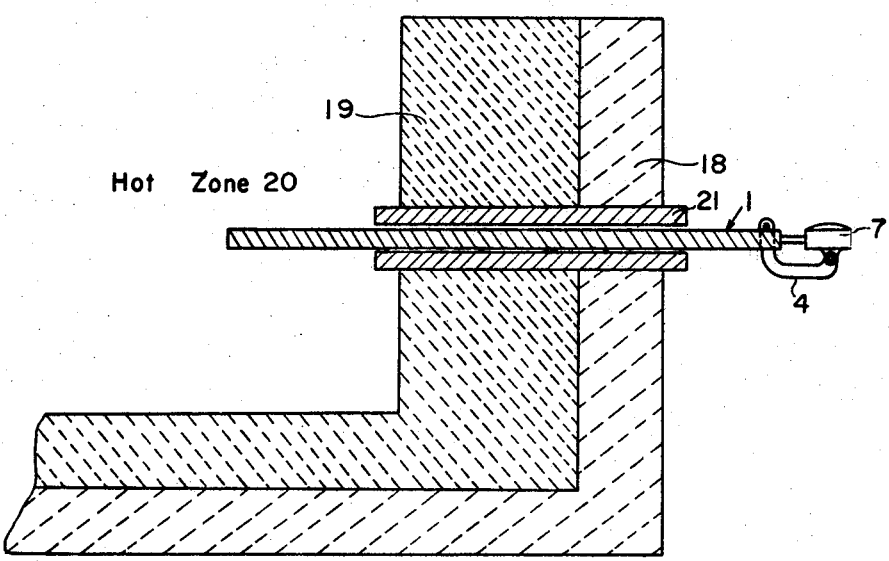
FIG. 4 is a diagrammatic section showing the provision of a pyrometer in a high temperature industrial furnace.
Figure 5:
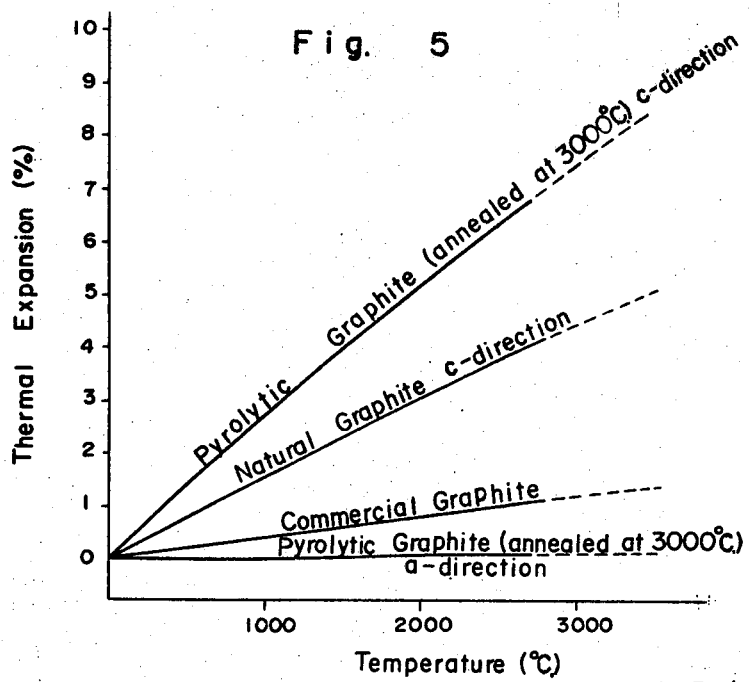
FIG. 5 is a graphical diagram showing thermal expansions of several kinds of graphite products.
Figure 6:
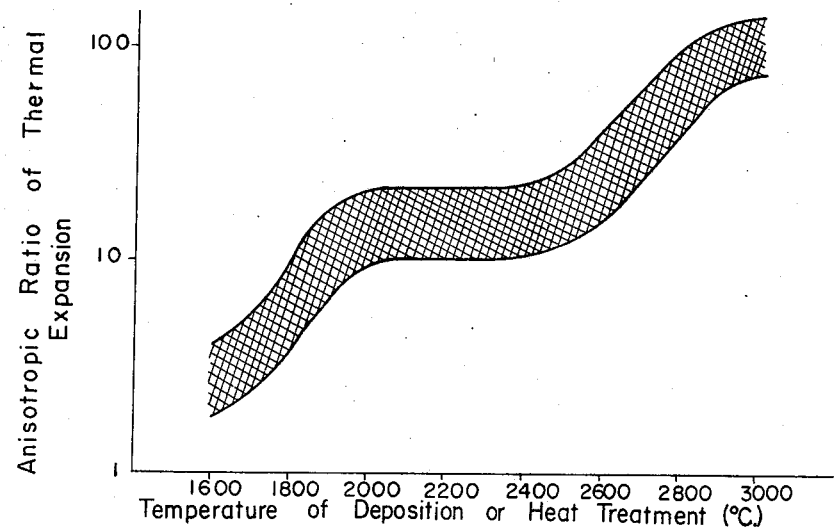
FIG. 6 is a graphical diagram showing an anisotropy in thermal expansion of pyrolytic graphite between the a–b- (or a-) direction and the c-direction in accordance with the temperature of heat treatment.

As is known, in general, the linear thermal expansion of a solid is shown by the following formula:

$$l = l_0(1+\alpha T) = l_0 + l_0 \alpha T$$

where
$l_0$ = length at 0° C.
$l$ = length at T° C.
$\alpha$ = linear coefficient of thermal expansion per °C.
T = temperature, °C.

From the above formula, an increment of length, $\Delta l$ is shown by:

$$\Delta l = l_0 \alpha T \qquad (a)$$

It is clear from the above (a) that in the detection of temperature by making use of the thermal expansion, the larger the value of and the greater the coefficient $\alpha$, the more advantageous for measurement.

In the pyrometer of this invention, pyrolytic graphite is used as a thermally responsive element. It is known that the coefficient of thermal expansion in the c-direction or perpendicular to the plane of deposition of pyrolytic graphite is $3.0 \times 10^{-5}/°C$.

In the above (a), suppose T be 1000° C. and the coefficient of thermal expansion as set forth above, we obtain:

$$\frac{\Delta l}{l_0} = \alpha T = 3.0 \times 10^{-5} \times 1000$$

$$= 3.0 \times 10^{-2}$$

$$= 3\%$$

This means that it has an elongation of 3%.
In the same manner, it follows:
where $l_0 = 10$ mm., $\Delta l = 0.3$ mm.
$l_0 = 20$ mm., $\Delta l = 0.6$ mm.
$l_0 = 40$ mm., $\Delta l = 1.2$ mm.
$l_0 = 100$ mm., $\Delta l = 3.0$ mm.

The coefficients of thermal expansion of three kinds of graphite products, viz., (1) pyrolytic graphite deposited at a temperature of 2100° C., (2) pyrolytic graphite produced from (1) and heat treated at a temperature of 3000° C. and (3) artificial graphite are shown as follows:

| | Coefficient of Thermal Expansion Per ° C., Room temperature to 2,800° C. | |
|---|---|---|
| | a-direction | c-direction |
| (1) Pyrolytic Graphite | $1.7 \times 10^{-6}$ | $2.7 \times 10^{-5}$ |
| (2) Pyrolytic Graphite | $3.0 \times 10^{-7}$ | $3.0 \times 10^{-5}$ |
| (3) Artificial Graphite | $3.0 \times 10^{-6}$ | |

It follows from the above table that if the length in the c-direction of pyrolytic graphite is 30 mm., the difference of thermal expansion between the c-direction and a-direction in the case of pyrolytic graphite (1) is about 75 micron per 100° C. while that of expansion between two directions in pyrolytic graphite (2) is about 90 micron per 100° C.

In view of the considerable difference of coefficients of thermal expansion of pyrolytic graphite deposited at 2100° C. and heat treated at 3000° C. between the a-direction parallel to the plane of deposition and the c-direction perpendicular thereto, the present invention contemplates taking advantage of the above difference in thermal expansion and providing an easy and accurate process for measuring tempertures.

Referring more particularly to FIG. 1 which shows a diagrammatic section of the preferred embodiment of pyrometer of this invention, the pyrometer 1 comprises an elongated tubular member 3, within one end (right-hand in FIG. 1) of which is provided a number of pyrolytic graphite disks stacked in a stack extending in the c-direction of the disks and this end portion is adapted to be exposed to the hot zone to be measured. The other end of the tubular member 3 is provided with a dial gauge 7 adapted to be responsive to a displacement of a detecting rod 2 owing to the thermal expansion of the c-direction stacked pyrolytic graphite disks. As described hereinbefore, the pyrometer 1 of this invention is characterized by the use of pyrolytic graphite as a thermally responsive element. In FIG. 1, a cap-like element 8 consists of a-direction pyrolytic graphite and the thermally responsive element 9 consists of the c-direction pyrolytic graphite. When the end of the tubular member 3 which consists of the c-direction pyrolytic graphite 9 housed in the cap-like a-direction pyrolytic graphite element 8 is exposed to the hot zone, it is seen that both the cap-like element 8 and the c-direction pyrolytic graphite 9 expand together owing to the high heat. At this time, the c-direction graphite 9 expands much more than the cap-like element 8, because the former has a larger coefficient of thermal expansion than the latter. Therefore, a graphite rod 2 accommodated within the tubular member 3 (this is made of graphite, too) is displaced by the difference of thermal expansion between the a-direction cap-like member 8 and the c-direction pyrolytic graphite 9 so that the dial gauge 7 moves its pointer in accordance with the displacement of the graphite rod 2.

Since the tubular member 3 of graphite and the graphite rod 2 housed therein are slidable with respect to each other, the displacement resulting from the difference in thermal expansion between the cap-like element 8 and the pyrolytic graphite 9 will be transmitted to a detecting means as a relative displacement between the tubular member 3 and the graphite rod 2. At the same time, the tubular member 3 serves as support which can be dipped into a hot zone to be measured.

In reference to the tubular member 3 and the rod 2, they are preferably made of graphite to obtain the benefits of refractoriness, and further, the outside of the tubular member 3 is preferably coated with a heat resisting coating material, such as, silicon carbide and the like, in order to enhance its refractoriness. In addition, the tubular member 3 and the graphite rod 2 are preferably made of a graphite material of the same quality or having the same coefficient of thermal expansion so as not to affect the displacement owing to thermal expansion of the thermally responsive element 9.

As shown in FIG. 1, the cap-like element 8 is fixed to the right end of the tubular member 3 by machining or shaping the end portion thereof. It is to be noted that the cap-like element 8 is secured to the tubular member 3. A number of pyrolytic graphite disks 9 which expand most in the c-direction are inserted within the cap-like element 8 in such manner that the planes of deposition thereof are perpendicular to the axis of the tubular member 3.

Figure 7:
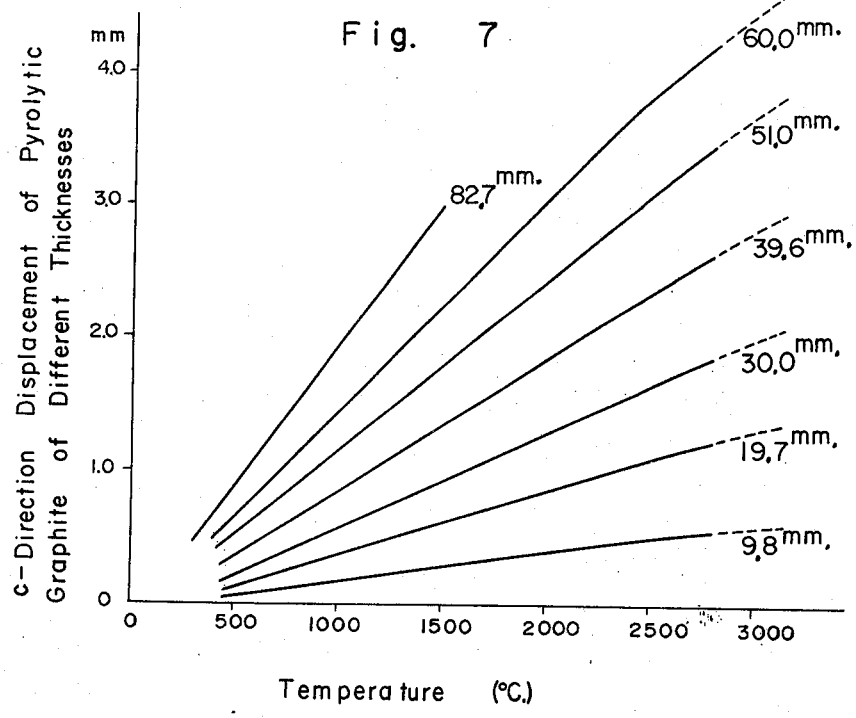
FIG. 7 is a graphical diagram showing the displacement of expansion in the c-direction of pyrolytic graphite of different thicknesses.

A disk of pyrolytic graphite 9 can be made as thick as desired by the technique of deposition, but it has been found that the larger the number of disks of graphite forming the element 9 the more accurate it will be. In connection with the thickness of pyrolytic graphite element 9, FIG. 7 shows the graphical diagrams of the results of experimental research conducted on the displacement due to thermal expansion of a stack of disks which are 9.8 mm., 19.7 mm., 30.0 mm., 39.6 mm., 51.0 mm., 60.0 mm., and 82.7 mm. in thickness respectively, and which form the pyrolytic graphite laminated assembly.

As shown in FIG. 1, the graphite rod 2 is slidably provided within the tubular member 3 in contact with the laminated pyrolytic graphite element 9, and a detecting terminal 5 is provided on a fixture 4. A coil spring 6 is provided around the terminal 5 so as to urge it towards the rod 2. The terminal 5 is connected to a direct reading type dial gauge 7 to complete the pyrometer of this invention.

It is understood that this pyrometer can be combined with a temperature calibrated instrument by the aid of a known differential transformer in order to let it record the course of temperature measurement automatically. Another preferred embodiment of the pyrometer combined with the automatic record means is shown in FIG. 3, which will be described hereinafter.

One feature of the thermally responsive element consisting of pyrolytic graphite of this invention lies in the fact that the sensibility of temperature measurement of this pyrometer depends upon the thickness of the element. For example, it has been found that when the element is 10 mm. in thickness, it expands 3 micron per 10° C. while it is 20 mm. it expands 3 micron per 5° C.

In order that the pyrometer of this invention can be used effectively, it is preferred that a standard temperature graph should be initially made and used as a standard for correcting the temperature scale of the pyrometer. Once corrected, it is no longer required to correct it again.

In the pyrometer of FIG. 1, the pyrolytic graphite of cap-like element 8 is oriented so that the expansion in the a-direction is parallel to the length of the pyrometer, while the graphite of the disks 9 is oriented so that the expansion in the c-direction is parallel to the length of the pyrometer. Therefore the graphite of disks 9 expands more than that of cap-like element 8 to transmit displacement resulting from expansion to the rod 2, whereby the pointer of the dial gauge 7 is moved thereby to indicate temperature. However, theoretically it is understood that the above arrangement of graphites of members 8 and 9 should be such that the expansion of one is in the a-direction and that in the other in the c-direction for temperature measurement. When the graphites of members 8 and 9 are arranged in this relationship, it follows that the pointer of the dial gauge 7 indicates the difference in the expansion. However, it is expedient to have the elements 8 and 9 arranged as in FIG. 1 from the viewpoint of manufacture. As described hereinbefore, the pyrolytic graphite 9 may be in the form of a number of flat disks or a single block.

The pyrometer of this invention shown in FIG. 1 has a range of temperature measurement in which the pyrolytic graphite 9 exhibits a uniform thermal expansion. When the pyrolytic graphite deposited at a temperature of 2100° C. is employed, it is preferred that the range of measurement should be from room temperature to 2300° C., because it has been found that there is a fluctuation of size at a temperature of 2400° C. and upwards. However, it has been discovered that pyrolytic graphite deposited at 2100° C. and then subjected to heat treatment at a much higher temperature, say, 3000° C. and upwards, can be employed as a thermally responsive element up to the temperature of heat treatment. Experimentally, it has been found that the range of temperature measurement of the pyrometer consisting of pyrolytic graphite heat treated at 3500° C. is from room temperature to 3500° C.

Referring more particularly to the pyrometer of FIG. 1, the tubular member 3 and the graphite rod 2 are made of the same material having the same coefficient of thermal expansion, hence they expand similarly as they are heated so that their thermal expansion will not be detected. However, since the graphites of elements 9 and 8 have their respective different coefficient of thermal expansion, the difference of thermal expansion will be detected by the dial gauge according to the following formula:

$$\Delta l = l_0(\alpha_{in} - \alpha_{out})T$$

where $l_0$ = length of the graphite 9 at 0° C.
$\alpha_{in}$ = linear coefficient of thermal expansion of the graphite 9.
$\alpha_{out}$ = linear coefficient of thermal expansion of the graphite 8.
T = temperature, ° C.

when $\alpha_{in} = 3.0 \times 10^{-5}$ and $\alpha_{out} = 1.0 \times 10^{-6}$ at 1000° C., respectively, then $$\frac{\Delta l}{l_0} = (3.0 \times 10^{-5} - 1.0 \times 10^{-6})1000$$

$$= 2.9 \times 10^{-5} \times 1000$$

$$= 2.9 \times 10^{-2}$$

$$= 2.9\%$$

we obtain 2.9% at 1000° C.

When $$l_0 = 50 \text{ mm.}$$

then $$\Delta l = 50 \text{ mm.} \times \frac{2.9}{100} = 1.45 \text{ mm.}$$

When the length of the thermally responsive element, 9, is 50 mm., there is a sensitivity = 1.45/1000 mm. per ° C.

The greater the thickness of the pyrolytic graphite, thermally responsive element, in the c-direction, the more the sensitivity and the more accurate we can measure the temperature. However, it is seen that the thickness of the element 9 depends on the volume of an object to be measured, because when the length or thickness of the object to be measured is less than the thickness of the element 9, an error in measurement will naturally follow.

In measuring the temperature of molten metal or glass, an error will never take place when the thickness of element 9 is less than the depth of molten metal or glass. However, in measuring the temperature of an industrial furnace where a temperature gradient is great, it is necessary for the element 9 to make it not so long as required.

In reference to the accuracy of the pyrometer shown in FIG. 1, an error in measurement results from the difference of temperature between the tubular member 3 and the graphite rod 2, hence the longer the member 3 and rod 2 the more the error increases. It is seen that this error varies as the high temperature, so it is justified in detecting a relative temperature.

In case the detection of an accurate temperature is required within ±3%, it is preferred that another assembly of a tubular member 3 and rod 2 of the same dimension as those of pyrometer and without the thermally responsive element be used as a correction meter, heated simultaneously with the pyrometer of the invention, and the difference of displacement between them due to thermal expansion is detected, and further, a standard temperature graph is used for comparison, whereby a more accurate detection of temperature is obtained.

In the pyrometer of this invention, the cap-like member 8 is made of the pyrolytic graphite having a gas impervious property, and hence it will not be affected by the gaseous atmosphere in the furnace, though an optical pyrometer would be influenced thereby.

In reference to a measurement error of this pyrometer, the causes of error are: (1) When all of the elements 8 and 9 do not reach the temperature of an object to be measured. The sensitivity increases according as the thickness of the elements increases, but sometimes all of the elements do not reach the temperature of the furnace. In this case, a measurement error takes place naturally. (2) The difference of temperature of graphite rod 2 and tubular member 3. If the tubular member is of the same material as the rod, the coefficient of thermal expansion is equal. If there is a difference in temperature between them, an error occurs. (3) Time lag: in a gaseous atmosphere furnace, it takes a considerable time for all of the elements to reach the temperature of the object to be measured.

The periods of time required for an accurate temperature to be indicated on the dial of this pyrometer which has been inserted into a furnace which is at a constant temperature are shown as follows:

|  | Kryptol furnace | N₂ atmosphere furnace |
|---|---|---|
| 470° C | 5 seconds | 3 minutes 30 seconds. |
| 1,030° C | 16 seconds | 5 minutes. |
| 2,250° C | 27 seconds | 8 minutes. |

As shown above, in a gaseous atmosphere furnace an error may occur in measuring a rising or falling temperature. No error, however, takes place in measuring the rising or falling temperature in the range of up to 100° C. per hour.

In view of the causes of error, the following measures should be taken: (1) The length of elements: elements should not be any longer than required. The portion of the elements should not be longer than the hot zone of the object to be measured. In other words, the elements should be completely dipped into the hot zone; (2) The difference of temperature of tubular member 3 and rod 2. (a) The simultaneous use of the correction meter described hereinbefore which shows an error due to the difference of temperature of the tubular member and rod. On reading the difference on the graduated scale of the pyrometer and correction meter (difference of thermal expansion), an accurate temperature can be read; (b) Elimination of difference of temperature. The cause of the difference of temperature of the tubular member and rod is due to cooling the surface of the tubular member so that the rod has a higher temperature. It has been found that when the rod has a lower temperature than the tubular member, the error is small. It is preferred that the material of the tubular member should be different from that of the graphite rod, but both of them should have the same coefficient of thermal expansion, yet the rod should have a smaller thermal conductivity than the tubular member. For example, the graphite rod is preferably made of a graphite material having a porosity of 33.5% and a bulk specific gravity of 1.5 while the tubular member is made of a graphite material having a porosity of 20% and a bulk specific gravity of 1.8.

FIG. 2 shows a pyrometer of this invention which is different from that of FIG. 1 in that the tubular member 3 does not include a cap-like member 8 made of a pyrolytic graphite with a-direction expansion parallel to the rod, but includes a pyrolytic graphite of c-direction therein. In the manufacture of the tubular member 3 of the pyrometer 1, it is understood that when it is desired to make the member 3 and the graphite rod 2 longer, additional lengths of the member 3 can be connected to the end cover portion by means of a screw threaded portion 22, and the parts of rod 2 therein can be abutted at 23 with no adhesive therebetween.

The material of the tubular member 3 and the rod 2 can be selected from the group consisting of a refractory metal, such as, W, Re and Ta, a refractory oxide, such as, $ZrO_2$, $ThO_2$, MgO, $HfO_2$, $CeO_2$, CaO, $BeO \cdot ZrO_2$, and $ThO_2 \cdot ZrO_2$, a refractory carbide, such as, HfC, MoC, NbC, TaC, ThC, TiC, VC, WC, and ZrC, BN, (boron nitride), natural graphite and recrystallized graphite. It is known that natural graphite and recrystallized graphite have almost the same or less anistropy of thermal expansion than pyrolytic graphite. The cap-like member 8 of FIG. 1 can be selected from any of the above materials.

It is understood that any of the above refractory materials could be employed in place of the pyrolytic graphite oriented for expansion in the c-direction as a thermally responsive element from a theoretical point of view.

However, it has been found from the experimental research heretofore conducted, the pyrolytic graphite which expands most in the c-direction is the most suitable element as a thermally responsive one.

In addition, it is seen that a pyrometer of this invention can be assembled by utilizing the difference of thermal expansion of two materials having a different coefficient of expansion with respect to each other.

FIG. 3 shows a preferred embodiment of the combination of a pyrometer and an automatic recording means. In FIG. 3, the thermally responsive element consisting of the pyrolytic graphite oriented in the c-direction 9 is surrounded by pyrolytic graphite oriented in the a-direction 8 is exposed to the hot zone. A joint portion 10 is made of a graphite material coated with silicon carbide. The thermal expansion is transmitted to an iron core 14 through the graphite rod 2, and then to an automatic recording means through a lead 17. The automatic recording means including a differential transformer 13 is well known. In reference to the differential transformer 13 voltage is generated in the secondary winding by a magnetic field induced by voltage of the primary winding. The magnetic field induced by the winding in the primary voltage is influenced by the iron core 14 provided at the center thereof, and the magnetic field is fluctuated by the movement of the iron core 14. It is arranged that the iron core 14 of the differential transformer is moved by a displacement caused by the thermal expansion of the pyrometer of this invention. The variation of the magnetic field causes a variation of voltage in the secondary winding of the differential transformer. Reading this variation of voltage in the secondary winding, we can read the displacement of thermal expansion, viz., temperature. The automatic recording means can record the change of temperature over a period of time in a known manner.

FIG. 4 shows how the pyrometer of this invention is provided in a graphitizing furnace. The thermally responsive element of the pyrometer protected by a heat resisting protecting sheath 21 is exposed to the hot zone of the furnace, and the dial gauge 7 of the pyrometer is held by a fixture 4. The refractory brick layer 18 and the silicon carbide lining layer 19 are provided, too, in a known manner.

The pyrometer of this invention will be described hereinbelow in connection with the following examples.

Example 1

A pyrolytic graphite was produced by depositing at a temperature of 2100° C. From this pyrolytic graphite a cap-like member 8 having an inner diameter, 20 mm., and a length, 50 mm. was made. The cap-like member had the graphite oriented with the a-direction parallel to the axis thereof. Each of the disks of pyrolytic graphite 9 with the c-direction in the stacking direction had an area, 14 x 14 square mm., and about 3 mm. in thickness. 10 disks of the above pyrolytic graphite were laminated to make the total thickness of 30 mm. A pyrometer having the total length of 900 mm. was assembled with a commercial dial gauge having a sensitivity of one micron as a displacement detector. The pyrometer thus assembled was inserted into a Tammann furnace in a nitrogen atmosphere for temperature measurement and heated to the temperature of 2050° C. At the same time the displacement of thermal expansion was observed by the aid of an optical pyrometer. As a result, the proportional relation between temperature and displacement of pyrolytic graphite was found as follows:

$$\Delta l = \frac{0.750 \text{mm.}}{1000° \text{ C.}} \times T$$

where $\Delta$ = displacement; $T$ = temperature °C.

The above measurement was carried out at several rates of rising temperature. In cases of quickly rising temperature was accompanied with a time lag or delay. However, at a speed of rising temperature up to 100° C. per hour, it has been found that no time lag occurs and reproducibility is good.

Example 2

A pyrometer shown in FIG. 2 was constructed in the following manner. Each of the elements 9 was made of pyrolytic graphite deposited at a temperature of 2100° C. and heat treated at a temperature of 3050° C. in the form of a circular disk, 15 mm. diameter and 3.00 mm. thick. 10 disks were laminated to make the total thickness of 30 mm. The tubular member 3 and the graphite rod 2 were made of artificial graphite of the same quality, and the former had an outer diameter of 40 mm., an inner diameter of 16 mm., and was 1500 mm. in length, and the latter had a diameter of 15.5 mm. and was 1460 mm. in length.

The pyrometer of the above dimensions was introduced into a Tammann furnace in a nitrogen atmosphere in order to examine its actions up to the temperature of 3000° C. The relation between temperature T and displacement $\Delta l$ was found as follows:

$$\Delta l = \frac{0.810 \text{ mm.}}{1000° \text{ C.}} \times T$$

A Kryptol graphitizing furnace had its temperature measured by this pyrometer inserted into the furnace wall 18 to expose its thermally responsive element to the hot zone 20 as shown in FIG. 4. The detected temperature was indicated on the dial gauge 7 fixed to the tubular member 3 by the fixture 4. In order to compare the pyrometer of this invention with an optical pyrometer, a hole was provided near the position of the pyrometer. To purge the gaseous atmosphere prevailing in the furnace, the nitrogen gas was supplied so as to flow into the hole through which the optical pyrometer measured temperature in a known manner.

A protecting sheath coated with silicon carbide was employed to protect the pyrometer and prevent the graphitic tubular member from oxidizing and bending. In this manner, during the operation of the furnace from energization to cooling, the temperature within the furance hitherto unable to be measured could be measured accurately up to the maximum temperature of 2950° C.

Example 3

This example is described in connection with FIG. 3 showing the combination of a pyrometer and an automatic recording means. 20 disks of pyrolytic graphite heat treated at a temperature of 3000° C. and about 3–5 mm. in thickness were employed to make the total thickness 82.7 mm. A cap-like member 8 was a crucible-like pyrolytic graphite heat treated at a temperature of 3000° C. with an outer diameter of 15 mm. and an inner diameter of 10 mm. The joint portion 10 between the tubular member 3 (outer diameter 35 mm. and inner diameter 10 mm.) and the cap-like member 8 was made of artificial graphite.

A differential transformer 13 was secured to the tubular member 3 by the fixtures 16 and 11. An iron core 14 was secured to the graphite rod 2, and a coil spring 12 was provided. The difference of thermal expansion between the thermally responsive element 9 and the cap-like member 8 was transmitted to the iron core 14 through the graphite rod 2 to produce a displacement of iron core 14, and the displacement was converted into an electric signal by means of the differential transformer 13 to record temperature measurement in an automatic manner. The function of the differential transformer has been described hereinbefore.

In addition, the above pyrometer was dipped into the molten iron tapped from a blast furnace for measuring the temperature of molten iron. In this case, one end including the thermally responsive element of the pyrometer was dipped into the molten iron to the depth of 90 mm. in order to effect an automatic recording of temperature. The temperature of the molten iron has hardly ever been measured in a continuous manner in the past. However, it has been measured continuously for a period of about 90 minutes by the automatic recording means combined with the pyrometer of this invention. The temperatures measured were 1340°–1460° C. In addition, it has been found that the surface of the cap-like element of pyrolytic graphite was not corroded by the molten iron nor did slag adhere to it.

As many changes could be made in the above constructions without departing from the scope of the invention, it is intended that all matter contained in the above description or shown in the accompanying drawings, shall be interpreted as illustrative and not in a limiting sense.

We claim:
1. A pyrometer comprising a thermally responsive means, an intermediate means and a temperature indicating means, said thermally responsive means comprising two members made of anisotropic graphite material having an anistoropy of thermal expansion in two directions which are perpendicular to each other, said one member of said thermally responsive means being a cap-like member the graphite material of which is oriented with the lower coefficient of expansion in a direction parallel to an axis of said pyrometer, and said other member being a plurality of graphite disks in said cap-like member and stacked in the direction parallel to said axis of said pyrometer and with the material oriented with the higher coefficient of expansion in the stacking direction, said intermediate member comprising a tubular member with said cap-like member thereon and a rod member both of which members are of a refractory material having the same coefficient of expansion, said rod member being engaged with said disks and slidable within said tubular member with the thermal expansion of said disks, and said temperature indicating means being engaged with said rod member and tubular member and having a pointer indicating a temperature in response to the difference of thermal expansion between said two members of said thermally responsive means.

2. A pyrometer as claimed in claim 1 in which said anisotropic graphite material is a material selected from the group consisting of pyrolytic graphite, natural graphite, and recrystallized graphite.

3. A pyrometer as claimed in claim 2 in which said graphite is pyrolitic graphite deposited at a temperature of 1600°–2500° C.

4. A pyrometer as claimed in claim 2 in which said graphite is pyrolytic graphite heat treated at a temperature of 2000°–3600° C.

5. A pyrometer as claimed in claim 2 in which said graphite is pyrolytic graphite containing 0.01–3% by weight of an element selected from the group consisting of boron, molybdenum, silicon and bromine.

6. A pyrometer as claimed in claim 1 said plurality of graphite disks are laminated to one another and positioned within the end of said cap-like member.

7. A pyrometer as claimed in claim 1 in which said refractory material of said tubular member and said rod is a material selected from the group consisting of artificial graphite, pyrolytic graphite, recrystallized graphite, natural graphite, tungsten, rhenium, tantalum, $ZrO_2$, $ThO_2$, $MgO$, $HfO_2$, $CeO_2$, $CaO$, $BeO \cdot ZrO_2$, $ThO_2 \cdot ZrO_2$, $HfC$, $MoC$, $NbC$, $TaC$, $ThC$, $TiC$, $VC$, $WC$, $ZrC$, and $BN$.

8. A pyrometer as claimed in claim 1 in which said cap-like member and said tubular member are of the same refractory material.

9. A pyrometer as claimed in claim 1 in which said tubular member and said cap-like member are coated with silicon carbide.

References Cited

UNITED STATES PATENTS 3,038,337    6/1962    Diefendorf _____ 73—363.9 X

FOREIGN PATENTS 250,021    1929    Italy.
286,002    7/1914    Germany.

LOUIS R. PRINCE, Primary Examiner
JOSEPH W. ROSKOS, Assistant Examiner